(12) United States Patent  (10) Patent No.: US 6,476,587 B2
Sasaki                      (45) Date of Patent: Nov. 5, 2002

(54) POWER CIRCUIT, POWER CIRCUIT CONTROL METHOD AND ELECTRONIC DEVICE USING THE POWER CIRCUIT

(75) Inventor: Hiroshi Sasaki, Tokyo (JP)

(73) Assignee: NEC Tokin Corporation (JP)

( * ) Notice: Subject to any disclaimer, the term of this patent is extended or adjusted under 35 U.S.C. 154(b) by 0 days.

(21) Appl. No.: 09/977,537

(22) Filed: Oct. 15, 2001

(65) Prior Publication Data

US 2002/0044637 A1 Apr. 18, 2002

(30) Foreign Application Priority Data

Oct. 18, 2000  (JP) ........................................ 2000-318310

(51) Int. Cl.[7] ......................... H01M 10/44; H01M 10/66
(52) U.S. Cl. ........................................................ 320/166
(58) Field of Search ................................. 320/116, 126, 320/127, 128, 132, 134, 135, 166, 167

(56) References Cited

U.S. PATENT DOCUMENTS 5,119,010 A * 6/1992 Shirata et al.
5,498,951 A * 3/1996 Okamura et al.
5,528,121 A * 6/1996 Okamura
5,604,426 A * 2/1997 Okamura et al.
5,783,928 A * 7/1998 Okamura
6,316,917 B1 * 11/2001 Ohta

* cited by examiner

Primary Examiner—Edward H. Tso
(74) Attorney, Agent, or Firm—Hayes Soloway P.C.

(57) ABSTRACT

A power circuit is provided which is capable of improving use efficiency of a chemical cell.

When a voltage of a capacitor is higher than a reference voltage and a voltage obtained by converting a load current flowing through a load into a voltage is lower than another reference voltage, the voltage is applied from a chemical cell to the capacitor, causing the capacitor to be charged and the voltage and power accumulated in the capacitor are fed to the load. When a voltage obtained by conversion of the load current is larger than another reference value, only the power accumulated in the capacitor is fed to the load. When a voltage of a capacitor is lower than a reference voltage and a voltage obtained by conversion of the load current is lower than another reference value, a current whose level is limited to a predetermined level is fed from the chemical cell to the capacitor and the voltage of the chemical cell is applied to the load.

9 Claims, 5 Drawing Sheets

POWER CIRCUIT, POWER CIRCUIT CONTROL METHOD AND ELECTRONIC DEVICE USING THE POWER CIRCUIT

BACKGROUND OF THE INVENTION

1. Field of the Invention

The present invention relates to a power circuit using a chemical cell and more particularly to the power circuit that can be suitably used when power is supplied to a load whose power consumption changes intermittently, for example, to a power source of a power amplifier for transmission of a radio wave embedded in a portable cellular phone and to a method for controlling the power circuit and an electronic device using the above power circuit.

The present application claims priority of Japanese Patent Application No.2000-318310 filed on Oct. 18,2000, which is hereby incorporated by reference.

2. Description of the Related Art

When a power circuit using a chemical cell is connected to a load whose power consumption changes intermittently, since an internal impedance of the chemical cell is comparatively large, a phenomenon occurs in which a voltage of the chemical cell drops instantaneously at a same time when a load current increases instantaneously. To solve this problem, conventionally, a capacitor having a comparatively low internal impedance is connected to the chemical cell in parallel. This allows a combined impedance whose level is lower than that of the internal impedance of the chemical cell to be formed and therefore even when the load whose power consumption changes intermittently is connected, an instantaneous voltage drop rate in voltage decreases compared with a case in which the chemical cell is singly used.

The conventional power circuit of this type, as shown in FIG. 5, includes a chemical cell 1 and a capacitor 2 connected to the chemical cell 1 in parallel and a load L connected to the chemical cell 1 and the capacitor 2. The chemical cell 1 is made up of, for example, a secondary cell such as a nickel-cadmium cell, nickel-hydrogen cell, or lithium ion cell, or an alkaline primary cell. Such the chemical cell 1 stores a predetermined amount of energy, produces electromotive force (that is, voltage V1) based on the stored energy and supplies it to the load L. The chemical cell 1 has an internal impedance 1a. The capacitor 2 is made up of, for example, an electrical double layer capacitor and is charged by the voltage V1 of the chemical cell 1, thus accumulating electric power, and then feeds the accumulated power to the load L. The capacitor 2 has an internal impedance 2a. The load L is, for example, a power amplifier for transmission of radio waves embedded in portable cellular phone or a like, whose power consumption changes intermittently and through which a pulse-like load current IL flows.

FIG. 6 is a timing chart explaining operations of the conventional power circuit of FIG. 5, in which a current or voltage is plotted as ordinate and time is plotted as abscissa. Operations of the power circuit of FIG. 5 will be described by referring to FIG. 6.

At a time t1, the load current IL increases instantaneously and the voltage V1 of the chemical cell 1 drops from a voltage level Va to a voltage level Vb. At this point, an internal impedance Z of the power circuit is given by:

$$Z = R1 \times R2/(R1+R2)$$

where R1 denotes a value of the internal impedance 1a and R2 denotes a value of the internal impedance 2a. The internal impedance Z is smaller than the value R1 of the internal impedance 1a. Therefore, a drop rate of the voltage Vb is lower than that of a voltage Vc occurring when the power circuit is made up of only the chemical cell 1. At a time t2, the pulse-like load current IL decreases instantaneously and the voltage V1 returns from the voltage level Vb to the voltage level Va. A voltage V2 of the capacitor 2 changes in the same manner as in the voltage V1.

Thus, when the capacitor 2 is connected to the chemical cell 1 in parallel, since the drop rate of the voltage Vb is lower than that of the voltage Vc, time during which the chemical cell 1 can be used per one time charging is made longer compared with the case in which the power circuit is made up of only the chemical cell 1. Moreover, when the chemical cell 1 is constructed of the alkaline primary cell having a comparatively high internal impedance, a life of the chemical cell 1 is made longer when compared with the case in which the power circuit is made up of only the chemical cell 1.

However, the above conventional power circuit has a following problem.

That is, in an electronic device having the power circuit shown in FIG. 5, since judgement on a residual capacity of the chemical cell 1 is made based on the drop in the voltage V1, the chemical cell 1 is judged to have no residual capacity even by the instantaneous drop in the voltage V1 in some cases. However, when the chemical cell 1 is constructed of, for example, the alkaline primary cell, even if the chemical cell 1 is judged to have no residual capacity in an electronic device, in some cases, the chemical cell 1 can be used in another electronic device. This phenomenon shows that the chemical cell 1 has not run out of its capacity completely. As a result, the chemical cell 1 is judged to have gotten to an end of its life in a state where a depth of discharge (a ratio of discharged capacity to a rated capacity) of the chemical cell 1 is still shallow, thus causing a decrease in use efficiency of the energy of the chemical cell 1.

On the other hand, when the chemical cell 1 is made up of, for example, the secondary cell such as the nickel-cadmium cell, nickel-hydrogen cell, lithium ion cell, or a like, there is a problem that, if the chemical cell 1 has not run out of the capacity completely, time during which the chemical cell 1 can be used per one time charging becomes extremely shorter than the usable time that the capacity of the original chemical cell 1 can provide. Moreover, when the capacitor 2 is connected to the chemical cell 1 in parallel, if the capacitor 2 has not been charged, since a large inrush current flows from the chemical cell 1 into the capacitor 2, burning of a wiring pattern used to connect the chemical cell 1 to the capacitor 2 and/or degradation of the chemical cell 1 and the capacitor 2 occur in some cases. In particular, when the chemical cell 1 is made up of the lithium ion secondary cell in which a current control circuit is embedded, a failure occurs in the current control circuit.

SUMMARY OF THE INVENTION

In view of the above, it is an object of the present invention to provide a power circuit capable of improving use efficiency of energy in a chemical cell and of preventing an inrush current from flowing from the chemical cell into a capacitor even when the capacitor having not yet been charged is connected to the chemical cell in parallel and a method for controlling the above power circuit and an electronic device using the power circuit.

According to a first aspect of the present invention, there is provided a power circuit including:

a chemical cell used to store a predetermined amount of energy, to produce electromotive force based on the energy and to feed the electromotive force to a load;

a capacitor which is charged by the electromotive force produced by the chemical cell and accumulates electric power and applies the accumulated electric power to the load;

a control section; and wherein the control section, when a voltage of the capacitor is higher than a first reference value and when a load current flowing through the load is smaller than a second reference value, applies a voltage produced by the chemical cell to the capacitor from the chemical cell to charge the capacitor and, at a same time, feeds the electromotive force produced by the chemical cell and the accumulated electric power in the capacitor to the load and, when the load current is larger than the second reference value, feeds only the accumulated electric power in the capacitor to the load and, when a voltage of the capacitor is lower than the first reference value and the load current flowing through the load is smaller than the second reference value, applies a current whose level is limited to a predetermined level to the capacitor from the chemical cell to charge the capacitor and feeds the electromotive force produced by the chemical cell to the load.

In the foregoing, a preferable mode is one wherein the control section includes:

a capacitor voltage detecting unit which compares a voltage of the capacitor with the first reference value and, when the voltage of the capacitor is lower than the first reference value, outputs a first detection signal being in an active mode and, when the voltage of the capacitor is higher than the first reference value, outputs the first detection signal being in a non-active mode;

a load current detecting unit which detects the load current and, when the load current is higher than the second reference value, outputs a second detection signal being in an active mode and, when the load current is smaller than the second reference value, outputs the second detection signal being in a non-active mode; and an electric power feeding and charging unit which feeds, when the first detection signal is in the non-active mode and the second detection signal is in the non-active mode, a voltage produced by the chemical cell from the chemical cell to the capacitor to charge the capacitor and, at a same time, feeds the electromotive force produced by the chemical cell and the accumulated electric power in the capacitor to the load and, when the second detection signal is in the active mode, feeds only the accumulated electric power in the capacitor to the capacitor and, when the first detection signal is in the active mode and the second detection signal is in the non-active mode, feeds a current whose level is limited to a predetermined level to the capacitor from the chemical cell to charge the capacitor and, at a same time, applies the electromotive force produced by the chemical cell to the load.

Also, a preferable mode is one wherein the capacitor is made up of an electrical double layer capacitor having an internal impedance being lower than an internal impedance of the chemical cell.

Furthermore, a preferable mode is one wherein the capacitor, while only the accumulated electric power in the capacitor is fed to the load, stores electric power exceeding power consumed by the load when the second detection signal is in the active mode.

According to a second aspect of the present invention, there is provided a method for controlling a power circuit having a chemical cell used to store a predetermined amount of energy, to produce electromotive force based on the energy and to feed the electromotive force to a load, a capacitor which is charged by the electromotive force produced by the chemical cell and accumulates electric power and applies the accumulated electric power to the load and a control section, the method including:

a step of applying, by using the control section, when a voltage of the capacitor is higher than a first reference value and a load current flowing through the load is smaller than a second reference value, a voltage produced by the chemical cell to the capacitor from the chemical cell to charge the capacitor, feeding, at a same time, the electromotive force produced by the chemical cell and the accumulated electric power in the capacitor to the load, feeding only the accumulated electric power in the capacitor to the load when the load current is larger than the second reference value and, applying, when a voltage of the capacitor is lower than the first reference value and when the load current flowing through the load is smaller than the second reference value, a current whose level is limited to a predetermined level to the capacitor from the chemical cell to charge the capacitor and feeding the electromotive force produced by the chemical cell to the load.

According to a third aspect of the present invention, there is provided a method for controlling a power circuit having a chemical cell used to store a predetermined amount of energy, to produce electromotive force based on the energy and to feed the electromotive force to a load, a capacitor which is charged by the electromotive force produced by the chemical cell and accumulates electric power and applies the accumulated electric power to the load and a control section, the method including:

a step of mounting a capacitor voltage detecting unit, a load current detecting unit, and an electric power feeding and charging unit to the control unit;

a capacitor voltage detecting step of, by using the capacitor voltage detecting unit, detecting a voltage of the capacitor, comparing the detected voltage with the first reference value, outputting, when the voltage of the capacitor is lower than the first reference value, a first detection signal being in an active mode and outputting, when the voltage of the capacitor is higher than the first reference value, the first detection signal being in a non-active mode;

a load current detecting step of, by using the load current detecting unit, detecting the load current flowing through the load, comparing the detected load current with the second reference value and outputting, when the load current is higher than the second reference value, a second detection signal being in an active mode and outputting, when the load current is smaller than the second reference value, the second detection signal being in a non-active mode.

a first electric power feeding and charging step of, by using the electric power feeding and charging unit, feeding, when the first detection signal is in the non-active mode and the second detection signal is in the non-active mode, a voltage produced by the chemical cell from the chemical cell to the capacitor to charge the capacitor and feeding, at a same time, electromotive force produced by the chemical cell and electric power accumulated in the capacitor to the load;

an electric power feeding processing step of, by using the electric power feeding and charging unit, feeding, when the second detection signal is in the active mode, only electric power accumulated in the capacitor to the capacitor; and a second electric power feeding and charging step of, by using the electric power feeding and charging unit, feeding, when the first detection signal is in the active mode and the second detection signal is in the non-active mode, a current whose level is limited to a predetermined level to the capacitor from the chemical cell to charge the capacitor and applying, at a same time, electromotive force produced by the chemical cell to the load.

According to a fourth aspect of the present invention, there is provided an electronic device made up of a power circuit stated above.

According to a fifth aspect of the present invention, there is provided an electronic device using a method for controlling a power circuit stated above.

With the above configurations, when the load current increases instantaneously, only the accumulated electric power in the capacitor is fed to the load and therefore no drop in the voltage of the chemical cell occurs. Therefore, even if life of the chemical cell is judged based on a drop in the voltage, the chemical cell is not judged to have gotten to an end of its life in a state where a depth of discharge of the chemical cell is still shallow and, as a result, use efficiency of the energy of the chemical cell is improved. Moreover, when the voltage of the capacitor is lower than a reference voltage, since the current whose level has been controlled and limited to a predetermined level is fed from the chemical cell and the capacitor is charged, even while the capacitor has not yet been charged, no inrush current flows from the chemical cell into the capacitor, thus preventing burning of a wiring pattern connecting the chemical cell to the capacitor and/or degradation of the chemical cell and the capacitor.

BRIEF DESCRIPTION OF THE DRAWINGS

The above and other objects, advantages, and features of the present invention will be more apparent from the following description taken in conjunction with the accompanying drawings in which:

FIG. 1 is a schematic block diagram showing an example of electrical configurations of a power circuit according to a first embodiment of the present invention;

DETAILED DESCRIPTION OF THE PREFERRED EMBODIMENTS

Figure 2:
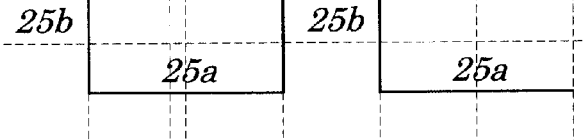
FIG. 2 is a timing chart of signals for each of components to explain a method for controlling the power circuit according to the first embodiment of the present invention.

Best modes of carrying out the present invention will be described in further detail using various embodiments with reference to the accompanying drawings.

First Embodiment

Figure 1:
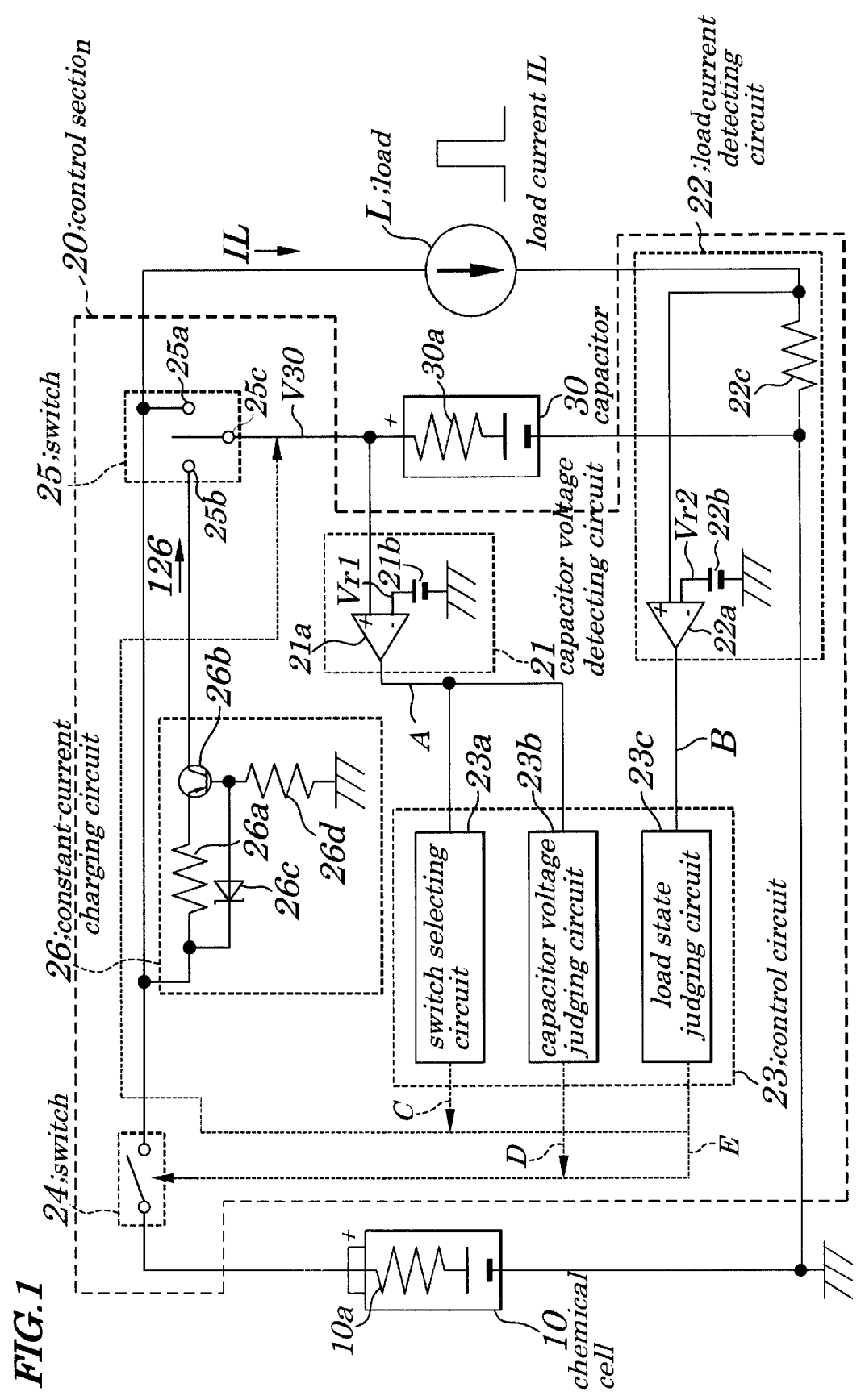

FIG. 1 is a schematic block diagram showing an example of electrical configurations of a power circuit according to a first embodiment of the present invention. The power circuit of the first embodiment, as shown in FIG. 1, includes a chemical cell 10, a control section 20, and a capacitor 30. To the chemical cell 10 and the capacitor 30 is connected a load L through the control section 20. The chemical cell 10 is made up of a secondary cell such as a nickel-cadmium cell, nickel-hydrogen cell, or lithium ion cell, or an alkaline primary cell or a like and stores a predetermined amount of energy, produces electromotive force (that is, voltage of chemical cell 10) V10 and supplies it to the load L. The chemical cell 10 has an internal impedance 10a.

The control section 20 has a capacitor voltage detecting unit (for example, capacitor voltage detecting circuit 21), a load current detecting unit (for example, load current detecting circuit 22), a control circuit 23, a switch 24, a switch 25, and a constant-current charging circuit 26. The control circuit 23, switch 24, switch 25, and constant-current charging circuit 26 make up a power supply charging unit. The capacitor voltage detecting circuit 21 has a comparator 21a and a reference voltage source 21b. The capacitor voltage detecting circuit 21 detects a voltage V30 of the capacitor 30 and compares the detected voltage V30 with a first reference voltage (that is, a reference voltage Vr1 fed from the reference voltage source 21b) and if the voltage V30 is lower than the reference voltage Vr1, outputs a first detection signal A being in an active mode (for example, at an low level, hereinafter "L") and, if the voltage V30 is higher than the voltage Vr1, outputs the first detection signal A being in a non-active mode (for example, at a high level, hereinafter "H").

The load current detecting circuit 22 has a comparator 22a, a reference voltage source 22b, and a resistor 22c. The load current detecting circuit 22 detects a load current IL flowing through the load L, converts the detected load current IL into a voltage by the resistor 22c and, if the voltage obtained by the conversion is higher than a reference voltage Vr2 (that is, a value obtained by converting a second reference voltage to a voltage by the resistor 22c) fed from the reference voltage source 22b, outputs a second detection signal B being in an active mode (for example, at a high level, hereinafter "H") and, if the voltage obtained by the conversion is lower than the reference voltage Vr2, outputs the second detection signal B being in a non-active (for example, at a low level, hereinafter "L").

The control circuit 23 has a switch selecting circuit 23a, a capacitor voltage judging circuit 23b, and a load state judging circuit 23c. The switch selecting circuit 23a outputs a driving signal C used to drive the switch 25 in response to a logical level of the first detection signal A. The capacitor voltage judging circuit 23b outputs a driving signal D used to drive the switch 24 in response to the logical level of the first detection signal A. The load state judging circuit 23c outputs a driving signal E used to drive the switch 24 or the switch 25 in response to a logical level of the second detection signal B. The switch 24 is made up of, for example, a MOSFET (Metal Oxide Semiconductor Field Effect Transistor) having low ON-state resistance and is driven in response to the driving signal D or E. The switch 25 is made up of, for example, the MOSFET having low ON-state resistance and has a contact 25a, a contact 25b, and a common contact 25c and is driven in response to the driving signal C or E.

The constant-current charging circuit 26 has a resistor 26a, a pnp transistor 26b, a constant voltage diode 26c, and a resistor 26d. In the constant-current charging circuit 26, when the switch 24 is turned ON and the common contact 25c of the switch 25 is connected to the contact 25b, the voltage V10 of the chemical cell 10 is input and a current I26 controlled so as to have a predetermined value set by a resistance of the resistor 26a and a Zener voltage of the constant-voltage diode 26c is output. The capacitor 30 is made up of, for example, an electrical double layer capacitor having an internal impedance being lower than that of the chemical cell 10. The capacitor 30 is charged when the voltage V10 of the chemical cell 10 is applied and accumulates electrical power and then feeds the accumulated electric power to the load L when its voltage V30 is increased to a set level and the common contact 25c of the switch 25 is connected to the contact 25a. The capacitor 30 has an internal impedance 30a. The load L is, for example, a power amplifier for transmission of radio waves embedded in a portable cellular phone or a like, whose power consumption changes intermittently and through which a pulse-like load current IL flows.

FIG. 2 is a timing chart of signals for each of components to explain a method for controlling the power circuit according to the first embodiment of the present invention, in which a current, voltage, and/or states of the switches 24 and 25 are plotted as ordinate and time is plotted as abscissa.

Methods (1) to (4) for controlling the power circuit of the embodiment are described by referring to FIG. 2.

(1) Control Method at a Time t0:

At the time t0, the voltage V30 of the capacitor 30 is detected by the capacitor voltage detecting circuit 21 and is then compared with the reference voltage Vr1 by the comparator 21a. Since the voltage V30 is higher than the reference voltage Vr1 (that is, the voltage V30 is higher than a predetermined lower limit value of the voltage V10), an "H" first detection signal A is output (capacitor voltage detection processing). Moreover, the load current IL flowing through the load L is detected by the load current detecting circuit 22 and the detected current is converted into the voltage value by the resistor 22c and is then compared with the reference voltage Vr2 by the comparator 22a. Since the voltage value is lower than the reference voltage Vr2 (that is, the load current IL is smaller than a predetermined threshold value ITH for the load current IL), an "L" second detection signal B is output (load current detection processing). At this point, the driving signal C is output from the switch selecting circuit 23a and the driving signal E is also output from the load state judging circuit 23c and, as a result, the common contact 25c of the switch 25 is connected to the contact 25a. At the same time, the driving signal E is output from the load state judging circuit 23c, causing the switch 24 to be turned ON. Then, the capacitor 30 is charged by the voltage V10 supplied by the chemical cell 10 and, at the same time, the supplied voltage V10 (the voltage supplied at this point is a reference value of the voltage V10) and the electric power are fed to the load L (first power supplying and charging processing).

(2) Control Method at a Time t1:

At the time t1, the load current IL increases instantaneously and, during a time T1, the load current IL becomes a constant level which corresponds to the level in the load L. At this point, in the load current detecting circuit 22, the load current IL is detected and is then converted into a voltage value by the resistor 22c and the converted voltage is compared with the reference voltage Vr2 by the comparator 22a. Since the voltage value is higher than the reference voltage Vr2 (that is, the load current IL is larger than a predetermined threshold value ITH for the load current IL), an "H" second detection signal B is output (load current detecting processing). At this point, the driving signal E is output from the load state judging circuit 23c, causing the switch 24 to be turned OFF. The common contact 25c of the switch 25 remains connected to the contact 25a. Since the chemical cell 10 is therefore put in a no-load state during the time T1 and the load becomes smaller compared with that in the state occurring at the time of t0 and the voltage drop caused by the internal impedance 10a is reduced, thus causing an increase in the voltage detection signal V10. At this point, the voltage V10 increases from its reference level to its upper limit level. Then, only the power accumulated in the capacitor 30 is fed to the load L (power supplying processing). Here, it is presumed that the power exceeding the power consumed by the load L during the time T1 is accumulated in the capacitor 30.

(3) Control Method at a Time t2:

At the time t2, when the load current IL decreases instantaneously and, in the load current detecting circuit 22, the voltage V30 of the capacitor 30 is detected and is then compared with the reference voltage Vr1 by the comparator 21a. Since the voltage V30 is lower than the reference voltage Vr1 (that is, the voltage V30 is lower than a predetermined threshold value for the voltage V10), an "L" first detection signal A is output (capacitor voltage detecting processing). Moreover, in the load current detecting circuit 22, the load current IL is detected and is then converted into a voltage value by the resistor 22c and the converted voltage is compared with the reference voltage Vr2 by the comparator 22a. Since the converted voltage is lower than the reference voltage Vr2 (that is, the load current IL is smaller than the predetermined threshold value ITH for the load current IL), the "L" second detection signal B is output (load current detection processing). At this point, the driving signal C is output from the switch selecting circuit 23a. Also, the driving signal E is output from load state judging circuit 23c and the common contact 25c of the switch 25 is connected to the contact 25b and, at the same time, the driving signal E is output from the load state judging circuit 23c, causing the switch 24 to be turned ON. During a time T2, since current I26 whose level has been limited to a predetermined level by the constant-current charging circuit 26 is fed from the chemical cell 10 to the capacitor 30, the capacitor 30 is charged to have a constant current and the voltage V10 is applied to the load L (second power supplying and charging processing).

(4) Control Method at a Time t3:

At the time t3, in the capacitor voltage detecting circuit 21, the voltage V30 of the capacitor 30 is detected and is then compared with the reference voltage Vr1 by the comparator 21a. Since the voltage V30 is higher than the reference voltage Vr1 (that is, the voltage V30 is higher than a predetermined lower limit value of the voltage V10), the "H" first detection signal A is output (capacitor voltage detection processing). Moreover, in the load current detecting circuit 22, the load current IL is detected and is then converted into a voltage value by the resistor 22c and the converted voltage is compared with the reference voltage Vr2 by the comparator 22a. Since the voltage is lower than the reference voltage Vr2 (that is, the load current IL is smaller than a predetermined threshold value ITH for the load current IL), the "L" detection signal B is output (load current detection processing). At this point, the driving signal C is output from the switch selecting circuit 23a and the driving signal E is output from the load state judging circuit 23c and, as a result, the common contact 25c of the switch 25 is connected to the contact 25a and the driving signal E is output from the load state judging circuit 23c, thus causing the switch 24 to be turned ON. Then, during a time T3, the voltage V10 is fed to the capacitor 30 from the chemical cell 10 and the capacitor 30 is charged and, at the same time, the voltage V10 (this voltage V10 increases from its lower limit level to its reference level) and the power accumulated in the capacitor 30 are supplied to the load L (first power supplying and charging processing).

Thus, in the first embodiment of the present invention, when the load current IL increases instantaneously, since only the power accumulated in the capacitor 30 is applied to the load L, no drop in the voltage V10 of the chemical cell 10 occurs. Therefore, even if life of the chemical cell 10 is judged based on the drop in the voltage V10, the judgement of the life of the chemical cell 10 is not made while its depth of discharge is shallow and, as a result, use efficiency of energy of the chemical cell 10 is improved. Moreover, when the voltage V30 of the capacitor 30 is lower than the reference voltage Vr1, since the current I26 whose level has been controlled and limited to the predetermined level by the constant-current charging circuit 26 is fed from the chemical cell 10 and the capacitor 30 is charged, even while the capacitor 30 has not yet been charged, no inrush current flows from the chemical cell 10 to the capacitor 30, thus preventing burning of wiring pattern connecting the chemical cell 10 to the capacitor 30 and/or degradation of the chemical cell 10 and the capacitor 30.

Second Embodiment

Figure 3:
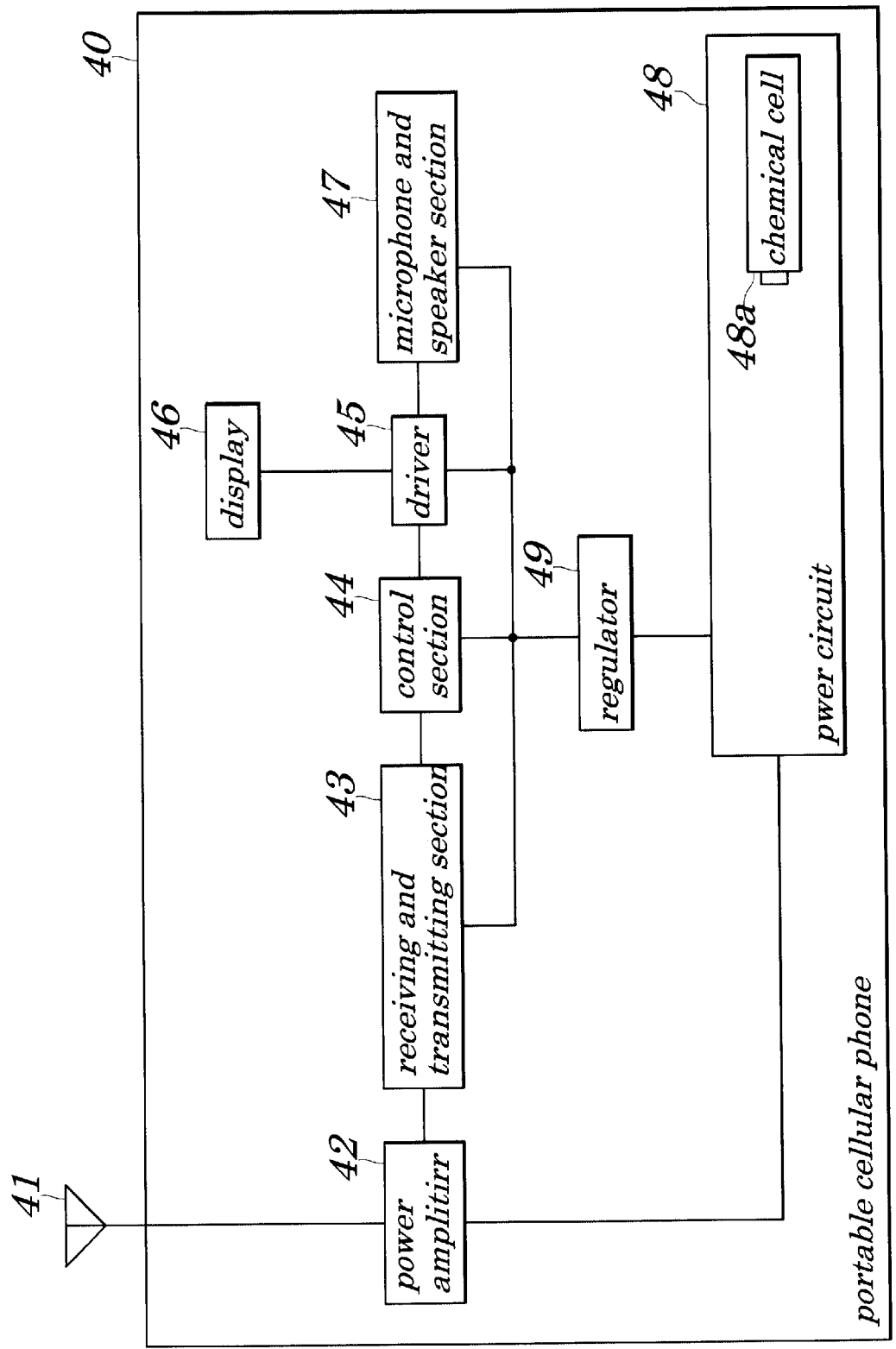
FIG. 3 is a schematic block diagram showing electrical configurations of an electronic device according to a second embodiment of the present invention.

FIG. 3 is a schematic block diagram showing electrical configurations of an electronic device according to a second embodiment of the present invention.

The electronic device of the second embodiment, as shown in FIG. 3, is a portable cellular phone 40, which includes an antenna 41, a power amplifier 42, a receiving and transmitting section 43, a control section 44, a driver 45, a display 46, a microphone and speaker section 47, a power circuit 48, and a regulator 49. The power amplifier 42 transmits a transmission signal output from the receiving and transmitting section 43 through the antenna 41 by a TDMA (Time Division Multiple Access) method. As the TDMA method, PDC (Personal Digital Cellular) is employed in Japan and GSM (Global System for Mobile communication) in Europe.

The receiving and transmitting section 43 receives and transmits radio signals through the antenna 41. The control section 44 is made up of a CPU (Central Processing Unit) or a like and controls an entire operation of the portable cellular phone 40 based on a control program. The driver 45 converts a voice signal inputted from the microphone and speaker section 47 into a digital signal and, at the same time, also converts received digital signal into a voice signal and transfers it to the microphone and speaker section 47. Also, the driver 45 transmits a signal for displaying to the display 46. The display 46 displays information about various messages for a user. The power circuit 48, configured in the same manner as in the first embodiment, has a chemical cell 48a and feeds an output power to the power amplifier 42. The regulator 49 receives output voltage from the power circuit 48 and outputs a voltage having a predetermined voltage value and feeds it to the receiving and transmitting section 43, control section 44, driver 45, and microphone and speaker section 47.

In the portable cellular phone 40, radio waves are transmitted by the TDMA method and a pulse-like load current having a frequency assigned based on the TDMA method is taken out from the power circuit 48. In the power circuit 48, since it is configured in the same manner as in the first embodiment shown in FIG. 1, even if load current flowing through the power amplifier 42 increases instantaneously, no drop in voltage of the chemical cell 48a occurs. Therefore, like the first embodiment, even when life of the chemical cell 48a is judged based on drop in voltage, judgment of the life of the chemical cell 48a is not made while its depth of discharge is shallow and, as a result, the use efficiency of the energy of the chemical cell 48a is improved.

Third Embodiment

Figure 4:
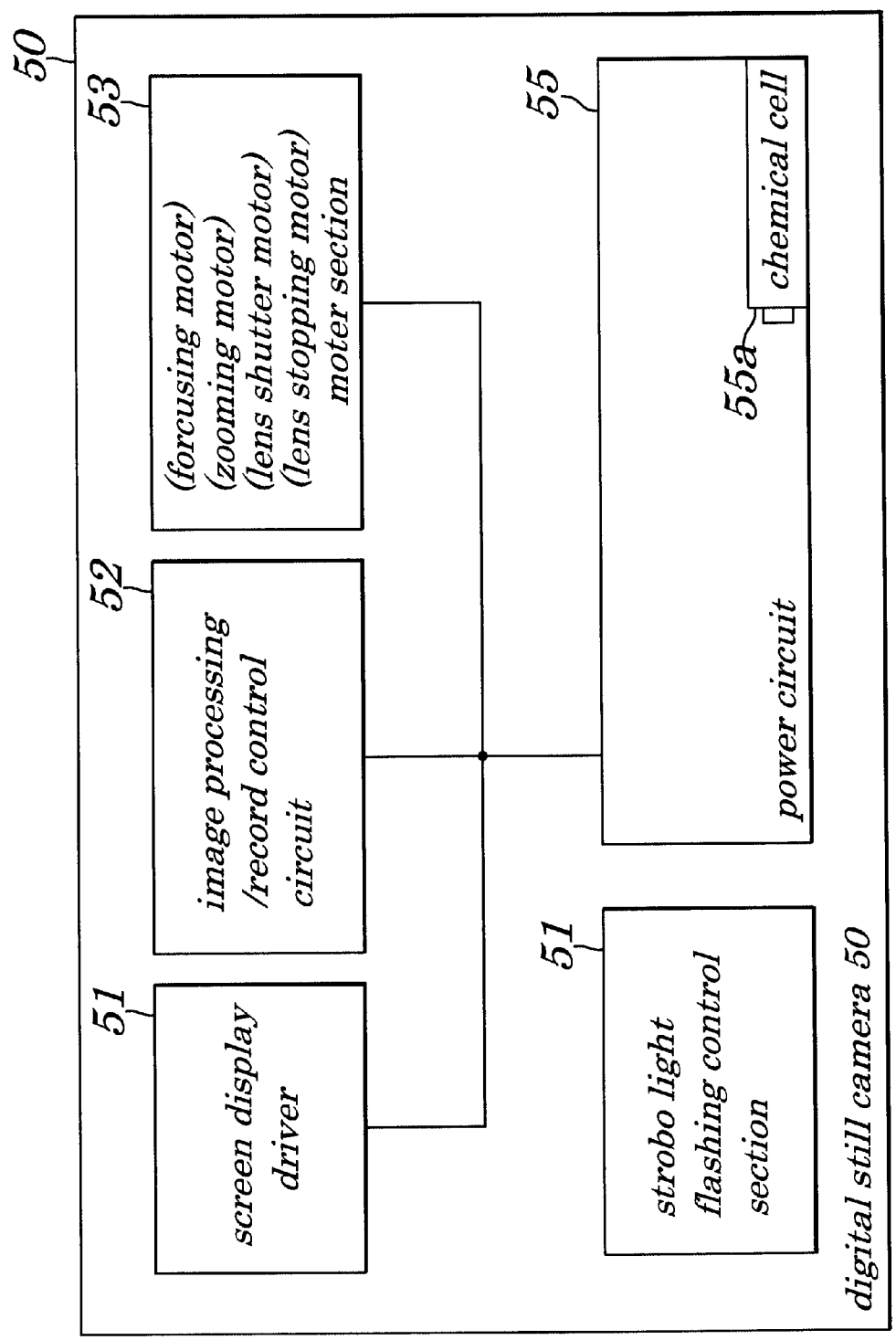
FIG. 4 is a schematic block diagram showing electrical configurations of an electronic device according to a third embodiment of the present invention.
Figure 5:
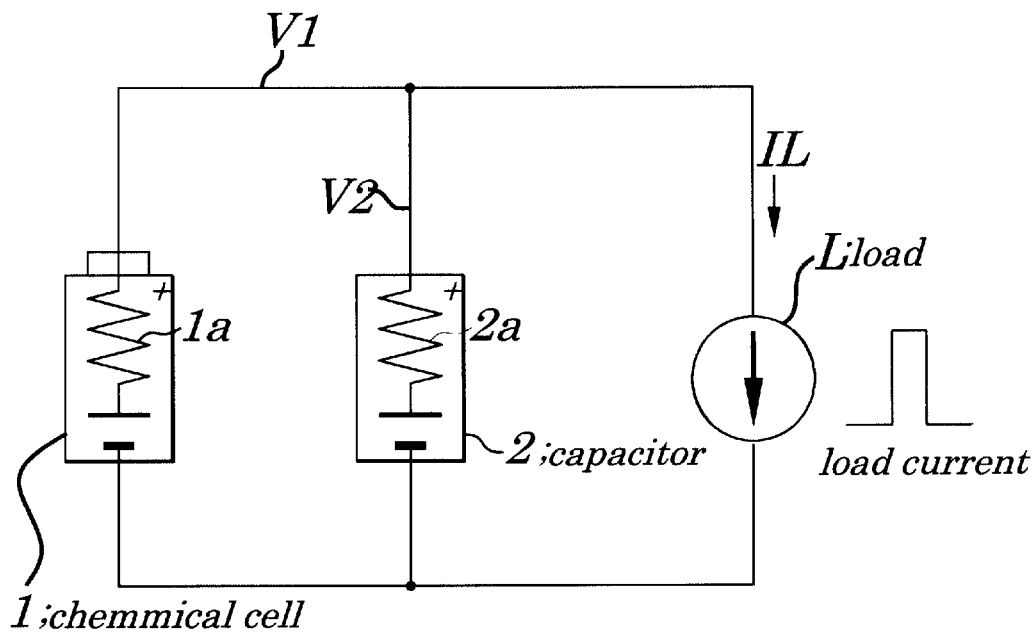
FIG. 5 is a circuit diagram showing configurations of a conventional power circuit.
Figure 6:
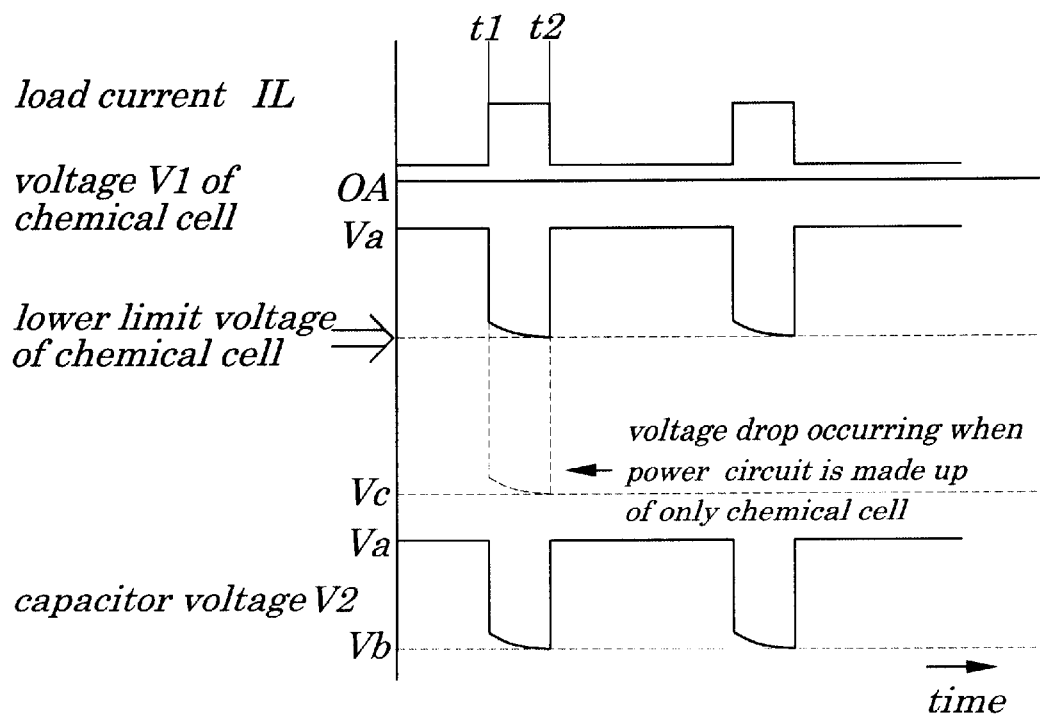
FIG. 6 is a timing chart explaining operations of the conventional power circuit of FIG. 5.

FIG. 4 is a schematic block diagram showing electrical configurations of an electronic device according to a third embodiment of the present invention.

The electronic device, as shown in FIG. 4, is a digital still camera 50 and includes a screen display driver 51, an image processing/record control circuit 52, a motor section 53, a strobe light flashing control section 54, and a power circuit 55. The screen display driver 51 transfers image data picked up by the digital still camera 50 to, for example, a display unit such as a display device in a personal computer. The image processing/record control circuit 52 performs predetermined processing on the image data picked up by the digital still camera 50 and stores it to a memory (not shown) or a like. The motor section 53 is made up of a focusing motor, zooming motor, lens shutter motor, lens stopping motor or a like. The strobe light flashing control section 54 causes a strobe light to flash when the image data is being picked up. The power circuit 55 is configured in the same manner as in the first embodiment shown in FIG. 1 and has a chemical cell 55a and feeds the output voltage to the screen display driver 51, image processing/record control circuit 52, motor section 53, and strobe light flashing control section 54.

In the digital still camera 50, when each of the screen display driver 51, image processing/record control circuit 52, motor section 53, and strobe light flashing control section 54 starts operations, a great load current is instantaneously taken out from the power circuit 55. In the power circuit 55, since it is configured in the same manner as in the first embodiment in FIG. 1, even if the load current increases instantaneously, no drop in the voltage of the chemical cell 55a occurs.

Thus, in the third embodiment of the present invention, since the power circuit 55 is configured in the same manner as in the first embodiment shown in FIG. 1, even if the load currents flowing through the screen display driver 51, image processing/record control circuit 52, motor section 53, and strobe light flashing control section 54 increase instantaneously, no drop in the voltage of the chemical cell 55a occurs. Therefore, like the first embodiment, even when the life of the chemical cell 55a is judged based on the drop in the voltage, the chemical cell 55a is not judged to have gotten to an end of its life in a state where the depth of discharge of the chemical cell 55a is still shallow and, as a result, use efficiency of energy of the chemical cell 55a is improved.

It is apparent that the present invention is not limited to the above embodiments but may be changed and modified without departing from the scope and spirit of the invention. For example, as the switches 24 and 25 employed in the above embodiments, in addition to the MOSFET, a bipolar transistor may be used. Also, as the resistor 22c in the load current detecting circuit 22 employed in the above embodiment, for example, a current sensor made up of a Hall device may be used. Instead of the constant-current charging circuit 26, any circuit may be used so long as constant currents can be obtained. Moreover, the present invention may be applied to not only a power circuit for the portable cellular phone, digital still camera or a like but also a power circuit for an electronic device whose power consumption changes intermittently and for the electronic device through which a great load current flows at a time of starting its operations.

What is claimed is:

1. A power circuit comprising:
   a chemical cell used to store a predetermined amount of energy, to produce electromotive force based on said energy and to feed said electromotive force to a load;
   a capacitor which is charged by said electromotive force produced by said chemical cell and accumulates electric power and applies said accumulated electric power to said load;
   a control section; and
   wherein said control section, when a voltage of said capacitor is higher than a first reference value and when a load current flowing through said load is smaller than a second reference value, applies a voltage produced by said chemical cell to said capacitor from said chemical cell to charge said capacitor and, at a same time, feeds said electromotive force produced by said chemical cell and said accumulated electric power in said capacitor to said load and, when said load current is larger than said second reference value, feeds only said electric power accumulated in said capacitor to said load and, when a voltage of said capacitor is lower than said first reference value and said load current flowing through said load is smaller than said second reference value, applies a current whose level is limited to a predetermined level to said capacitor from said chemical cell to charge said capacitor and feeds said electromotive force produced by said chemical cell to said load.

2. The power circuit according to claim 1, wherein said control section comprises:
   a capacitor voltage detecting unit which compares a voltage of said capacitor with said first reference value and, when said voltage of said capacitor is lower than said first reference value, outputs a first detection signal being in an active mode and, when said voltage of said capacitor is higher than said first reference value, outputs said first detection signal being in a non-active mode;
   a load current detecting unit which detects said load current and, when said load current is higher than said second reference value, outputs a second detection signal being in an active mode and, when said load current is smaller than said second reference value, outputs said second detection signal being in a non-active mode; and
   an electric power feeding and charging unit which feeds, when said first detection signal is in said non-active mode and said second detection signal is in said non-active mode, a voltage produced by said chemical cell from said chemical cell to said capacitor to charge said capacitor and, at a same time, feeds said electromotive force produced by said chemical cell and said accumulated electric power in said capacitor to said load and, when said second detection signal is in said active mode, feeds only said accumulated electric power in said capacitor to said load and, when said first detection signal is in said active mode and said second detection signal is in said non-active mode, feeds a current whose level is limited to a predetermined level to said capacitor from said chemical cell to charge said capacitor and, at a same time, applies said electromotive force produced by said chemical cell to said load.

3. The power circuit according to claim 1, wherein said capacitor is made up of an electrical double layer capacitor having an internal impedance being lower than an internal impedance of said chemical cell.

4. The power circuit according to claim 1, wherein said capacitor, while only said accumulated electric power in said capacitor is fed to said load, stores electric power exceeding power consumed by said load when said second detection signal is in said active mode.

5. A method for controlling a power circuit having a chemical cell used to store a predetermined amount of energy, to produce electromotive force based on said energy and to feed said electromotive force to a load, a capacitor which is charged by said electromotive force produced by said chemical cell and accumulates electric power and applies said accumulated electric power to said load and a control section, said method comprising:
   a step of applying, by using said control section, when a voltage of said capacitor is higher than a first reference value and a load current flowing through said load is smaller than a second reference value, a voltage produced by said chemical cell to said capacitor from said chemical cell to charge said capacitor, feeding, at a same time, said electromotive force produced by said chemical cell and said accumulated electric power in said capacitor to said load, feeding only said accumulated electric power in said capacitor to said load when said load current is larger than said second reference value and, applying, when a voltage of said capacitor is lower than said first reference value and when said load current flowing through said load is smaller than said second reference value, a current whose level is limited to a predetermined level to said capacitor from said chemical cell to charge said capacitor and feeding said electromotive force produced by said chemical cell to said load.

6. A method for controlling a power circuit having a chemical cell used to store a predetermined amount of energy, to produce electromotive force based on said energy and to feed said electromotive force to a load, a capacitor which is charged by said electromotive force produced by said chemical cell and accumulates electric power and applies said accumulated electric power to said load and a control section, said method comprising:
   a step of mounting a capacitor voltage detecting unit, a load current detecting unit, and an electric power feeding and charging unit to said control unit;
   a capacitor voltage detecting step of, by using said capacitor voltage detecting unit, detecting a voltage of said capacitor, comparing said detected voltage with said first reference value, outputting, when said voltage of said capacitor is lower than said first reference value, a first detection signal being in an active mode and outputting, when said voltage of said capacitor is higher than said first reference value, said first detection signal being in a non-active mode;
   a load current detecting step of, by using said load current detecting unit, detecting said load current flowing through said load, comparing said detected load current with said second reference value and outputting, when said load current is higher than said second reference value, a second detection signal being in an active mode and outputting, when said load current is smaller than said second reference value, said second detection signal being in a non-active mode.
   a first electric power feeding and charging step of, by using said electric power feeding and charging unit, feeding, when said first detection signal is in said non-active mode and said second detection signal is in said non-active mode, a voltage produced by said chemical cell from said chemical cell to said capacitor to charge said capacitor and feeding, at a same time, electromotive force produced by said chemical cell and electric power accumulated in said capacitor to said load;

an electric power feeding processing step of, by using said electric power feeding and charging unit, feeding, when said second detection signal is in said active mode, only electric power accumulated in said capacitor to said capacitor; and a second electric power feeding and charging step of, by using said electric power feeding and charging unit, feeding, when said first detection signal is in said active mode and said second detection signal is in said non-active mode, a current whose level is limited to a predetermined level to said capacitor from said chemical cell to charge said capacitor and applying, at a same time, electromotive force produced by said chemical cell to said load.

7. An electronic device provided with a power circuit, said power circuit comprising:

a chemical cell used to store a predetermined amount of energy, to produce electromotive force based on said energy and to feed said electromotive force to a load;

a capacitor which is charged by said electromotive force produced by said chemical cell and accumulates electric power and applies said accumulated electric power to said load;

a control section; and wherein said control section, when a voltage of said capacitor is higher than a first reference value and when a load current flowing through said load is smaller than a second reference value, applies a voltage produced by said chemical cell to said capacitor from said chemical cell to charge said capacitor and, at a same time, feeds said electromotive force produced by said chemical cell and said accumulated electric power in said capacitor to said load and, when said load current is larger than said second reference value, feeds only said electric power accumulated in said capacitor to said load and, when a voltage of said capacitor is lower than said first reference value and said load current flowing through said load is smaller than said second reference value, applies a current whose level is limited to a predetermined level to said capacitor from said chemical cell to charge said capacitor and feeds said electromotive force produced by said chemical cell to said load.

8. An electronic device provided with a power circuit having a chemical cell used to store a predetermined amount of energy, to produce electromotive force based on said energy and to feed said electromotive force to a load, a capacitor which is charged by said electromotive force produced by said chemical cell and accumulates electric power and applies said accumulated electric power to said load and a control section, said electronic device using a power circuit controlling method, said method comprising:

a step of applying, by using said control section, when a voltage of said capacitor is higher than a first reference value and a load current flowing through said load is smaller than a second reference value, a voltage produced by said chemical cell to said capacitor from said chemical cell to charge said capacitor, feeding, at a same time, said electromotive force produced by said chemical cell and said accumulated electric power in said capacitor to said load, feeding only said accumulated electric power in said capacitor to said load when said load current is larger than said second reference value and, applying, when a voltage of said capacitor is lower than said first reference value and when said load current flowing through said load is smaller than said second reference value, a current whose level is limited to a predetermined level to said capacitor from said chemical cell to charge said capacitor and feeding said electromotive force produced by said chemical cell to said load.

9. An electronic device provided with a power circuit having a chemical cell used to store a predetermined amount of energy, to produce electromotive force based on said energy and to feed said electromotive force to a load, a capacitor which is charged by said electromotive force produced by said chemical cell and accumulates electric power and applies said accumulated electric power to said load and a control section, said electronic device using a power circuit controlling method, said method comprising:

a step of mounting a capacitor voltage detecting unit, a load current detecting unit, and an electric power feeding and charging unit to said control unit;

a capacitor voltage detecting step of, by using said capacitor voltage detecting unit, detecting a voltage of said capacitor, comparing said detected voltage with said first reference value, outputting, when said voltage of said capacitor is lower than said first reference value, a first detection signal being in an active mode and outputting, when said voltage of said capacitor is higher than said first reference value, said first detection signal being in a non-active mode;

a load current detecting step of, by using said load current detecting unit, detecting said load current flowing through said load, comparing said detected load current with said second reference value and outputting, when said load current is higher than said second reference value, a second detection signal being in an active mode and outputting, when said load current is smaller than said second reference value, said second detection signal being in a non-active mode.

a first electric power feeding and charging step of, by using said electric power feeding and charging unit, feeding, when said first detection signal is in said non-active mode and said second detection signal is in said non-active mode, a voltage produced by said chemical cell from said chemical cell to said capacitor to charge said capacitor and feeding, at a same time, electromotive force produced by said chemical cell and electric power accumulated in said capacitor to said load;

an electric power feeding processing step of, by using said electric power feeding and charging unit, feeding, when said second detection signal is in said active mode, only electric power accumulated in said capacitor to said capacitor; and a second electric power feeding and charging step of, by using said electric power feeding and charging unit, feeding, when said first detection signal is in said active mode and said second detection signal is in said non-active mode, a current whose level is limited to a predetermined level to said capacitor from said chemical cell to charge said capacitor and applying, at a same time, electromotive force produced by said chemical cell to said load.

* * * * *